United States Patent [19]

Krude

[11] Patent Number: 5,501,639

[45] Date of Patent: Mar. 26, 1996

[54] CONSTANT VELOCITY UNIVERSAL BALL JOINT

[75] Inventor: Werner Krude, Neunkirchen-Wolperath, Germany

[73] Assignee: GKN Automotive AG, Lohmar, Germany

[21] Appl. No.: 3,630

[22] Filed: Jan. 13, 1993

[30] Foreign Application Priority Data

Jan. 15, 1992 [DE] Germany .......................... 42 00 848.4

[51] Int. Cl.⁶ .................................................. F16D 3/223
[52] U.S. Cl. .......................... 464/145; 148/639; 464/906
[58] Field of Search ........................................ 464/143, 145, 464/146, 906; 148/639

[56] References Cited

U.S. PATENT DOCUMENTS

| 2,590,546 | 3/1952 | Kindcaid et al. .................. | 148/639 |
|---|---|---|---|
| 3,656,318 | 4/1972 | Smith et al. . | |
| 3,818,721 | 6/1974 | Wallmark . | |
| 3,877,251 | 4/1975 | Wahlmark . | |
| 4,043,847 | 8/1977 | Just ................................. | 148/639 |
| 4,275,571 | 6/1981 | Welschof ......................... | 464/145 |
| 4,589,857 | 5/1986 | Okoshi ............................. | 464/145 |
| 4,693,698 | 9/1987 | Olson, II . | |
| 4,861,316 | 8/1989 | Welschof ......................... | 464/145 |
| 4,966,488 | 10/1990 | Mayhew . | |
| 5,167,584 | 12/1992 | Krude ............................... | 464/145 |

FOREIGN PATENT DOCUMENTS

| 3132363 | 1/1983 | Germany . |
|---|---|---|
| 60-122031 | 8/1985 | Japan . |
| 64-39321 | 9/1989 | Japan . |
| 3-26335 | 7/1991 | Japan . |

OTHER PUBLICATIONS

Abstract of Japan 58 197 220 published Nov. 1983.
Abstract of Japan 1039321 published Feb. 1989.
*Induktionserwärmung: Härten, Glühen, Schmelzen, Löten, Schweissen,* Benkowsky, G., Verlag Technik, 1990, Germany.

*Primary Examiner*—Daniel P. Stodola
*Assistant Examiner*—Eileen A. Dunn
*Attorney, Agent, or Firm*—Harness, Dickey & Pierce

[57] ABSTRACT

A constant velocity universal ball joint has an outer joint part and an inner joint part. Each part is provided with a plurality of ball tracks extending substantially in a longitudinal direction. The balls provide torque transmission and are guided in radially opposed tracks in the outer joint part and in the inner joint part. A cage with cage windows holds each ball in a plane positioned perpendicularly relative to the longitudinal axis. The cage includes a mechanism which, if the axes of the outer joint part and the inner joint part deviate from one another, guide the cage with the balls on to the angle-bisecting plane. Each of the track faces of the ball tracks, at the outer joint part and/or at the inner joint part, are subjected to loads by the balls, as well as each of the regions of the surfaces adjoining the ball tracks, which are guiding faces for the cage, undergo a hardening operation. Also, unhardened zones are provided between each two ball tracks between the guiding faces.

10 Claims, 4 Drawing Sheets

CONSTANT VELOCITY UNIVERSAL BALL JOINT

BACKGROUND OF THE INVENTION

The present invention relates to a constant velocity universal ball joint. The joint has an outer joint part and an inner joint part each provided with a plurality of ball tracks which extend substantially in the longitudinal direction. Balls are provided for torque transmitting purposes and are guided in the radially opposed tracks in the outer joint part and in the inner joint part. A cage is included which, in cage windows, holds each ball in a plane positioned perpendicularly relative to the axis. The cage includes a means to guide the cage with the balls on to the angle-bisecting plane, if the axes of the outer joint part and the inner joint part deviate from one another. The invention is utilized with different types of joints which will be described below.

In particular, the invention refers to Rzeppa fixed joints where direct control of the balls onto the angle-bisecting plane is effected by meridionally extending ball tracks. In this case the centers of the tracks of the inner joint part and outer joint part are offset in the longitudinal direction. Further, the invention refers to undercut-free UF joints which, basically follow the same principle as Rzeppa joints, but, if viewed axially, the ball tracks are designed to be undercut-free. Additionally, there are double offset DO joints where the inner face and outer face of the cage are provided with spherical guiding faces. The guiding faces have curvature centers which are axially offset relative to one another. Thus, when the joint is articulated, the cage is controlled directly and the balls indirectly so as to move onto the angle-bisecting plane. These joints may be produced with curved ball guiding tracks in the form of fixed joints and with straight ball guiding tracks in the form of axially plungeable joints.

Finally, VL joints are covered by the subject of the invention. VL joints, in their outer and inner joint parts, include tracks which are associated with one another and which at least part of do not extend strictly in the longitudinal direction but forman angle relative to one another. As a result of this orientation, the balls are directly controlled to the crossing of said tracks and move on to the angle-bisecting plane and onto half the plunging path.

With prior art joints of these types, the cages are either permanently or at least temporarily in sliding contact with the entire surfaces of the inner and/or outer joint part positioned between the ball tracks. Depending on the design of the surfaces, the contact permanently affects spherical portion faces or only wandering narrow annular portion faces. For wear reasons, it is essential that all sliding faces be hardened at the outer joint part and/or inner joint part. The hardening operation leads to the introduction of a great deal of heat which leads to hardness distortion and deformation of the parts. As a result, the distorted guiding faces of the parts must be machined after hardening. Or, if the parts are produced to their finish dimensions prior to hardening in order to eliminate the subsequent grinding operation, the hardness distortion at least requires classification to ensure the outer joint parts, inner joint parts and cages are selected to match one another. Both the grinding operation after hardening and classification after hardening increase production costs.

SUMMARY OF THE INVENTION

It is an object of the present invention to provide guiding faces between the cage and the inner and/or joint part which are hardened with respect to their wear resistance without involving grinding or classification operations. A further objective provides a suitable hardening method.

The objective is achieved by each of the inner and/or outer joint part track faces of the ball tracks subjected to loads by contact of the balls, as well as each of the regions of the surfaces adjoining the balls tracks, which are the guiding faces for the cage, undergoing a hardening operation. Also unhardened zones are positioned between each two ball tracks and between the guiding faces.

Deeper hardening of the contact regions in the ball tracks of joints is known from DE-PS 31 32 363, issued Jan. 13, 1983. Also, hardening of the roller tracks of tripod joints is shown in JP 3-26 335 Y2, issued Aug. 17, 1985. However, these patents shed little light on the problem solved by the present invention.

The guiding faces in accordance with the invention ensure the necessary wear strength. Also, because the size of the regions to be hardened is reduced, hardening distortions are reduced due to the introduction of less heat.

A method restricts hardening to the outer track faces near the edges of the ball tracks and to the guiding faces. Thus, hardening is restricted to the transition between the concave ball track and the outer joint part surfaces and/or inner joint part surfaces. The transition portions, if viewed in section, are partially circularly shaped.

The hardened guiding faces preferably extend uniformly along the entire guiding length, when viewed in a longitudinal section. However, it is also possible for the axial end regions to have wide hardened regions.

In a preferred embodiment, a carrying function is provided by the hardened guiding faces. The guide faces of the outer joint part project radially inwardly while the guide faces of the inner joint part project radially outwardly beyond the remaining surface regions, which are the unhardened regions between each two ball tracks. In a preferred design, these radially protruding guiding faces are the result of the hardening operation.

The reduced size of the carrying regions between the cage and the outer and/or inner joint part does not place the joint function at risk if local distortions occur. This is due to that at the reduced carrying faces, the parts rapidly wear off to a smooth contact.

A preferred method for producing the joints in accordance with the invention includes mechanically producing the outer and/or inner joint parts provided for guiding the cage. Thus, the joint parts include radial play relative to the cage with respect to compared dimensions. Also, the guiding faces at the outer and/or inner joint parts are produced by carrying out a hardening operation which increases the volume of the material. Further, there is no need to carry out any machining operations after the hardening operation. The required increases in volume due to the formation of martensite is achieved by applying a suitable process such as induction hardening.

The introduction of heat into the regions to be hardened is controllable so that there is no need to fear distortion of the entire component. It is particularly advantageous if any heat remaining in the component from a previous heat treatment, such as tempering, is used for the hardening process in accordance with the invention.

From the following detailed description taken in conjunction with the accompanying drawings and subjoined claims, other objects and advantages of the present invention will become apparent to those skilled in the art.

BRIEF DESCRIPTION OF THE DRAWINGS

Preferred embodiments of the invention are illustrated in the drawing wherein.

DETAILED DESCRIPTION OF THE PREFERRED EMBODIMENTS

Figure 1:
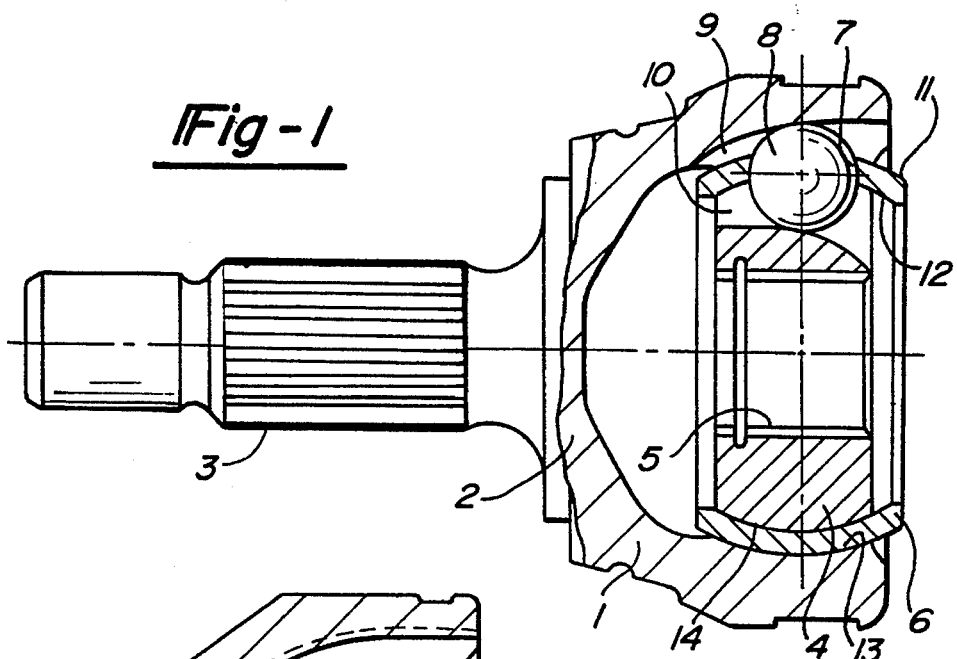
FIG. 1 is a longitudinal partial sectional view through a fully assembled constant velocity universal ball fixed joint.

The joint of FIG. 1 shows an outer joint part 1 with an integrally formed base 2 and a connecting journal 3. A substantially annular inner joint part 4 with a central plug-in aperture 5, which receives a shaft journal, is introduced into the open end of the outer joint part 1. A cage 6 is guided between the outer joint part 1 and the inner joint part 4. The cage 6 includes circumferentially distributed cage windows 7, which accommodate torque transmitting balls 8. The balls 8 engage longitudinally extending tracks 9 in the outer joint part 1 and tracks 10 in the inner joint part 4. The tracks 9 and 10 are positioned in pairs radially opposite one another. Because the track center lines are designed to be symmetric relative to one another, the balls are controlled to move onto the angle-bisecting plane when the inner joint part is articulated relative to the outer joint part, with the balls, relative to one another, being held by the cage in one plane.

The cage 6 includes outer face 11 having a spherical shape and an inner face 12 with a spherical shape. At least one of these faces is slidingly guided in inner faces 13 of the outer joint part and/or outer faces 14 of the inner joint part. These faces will be described in greater detail in connection with the remaining figures.

Figure 2:
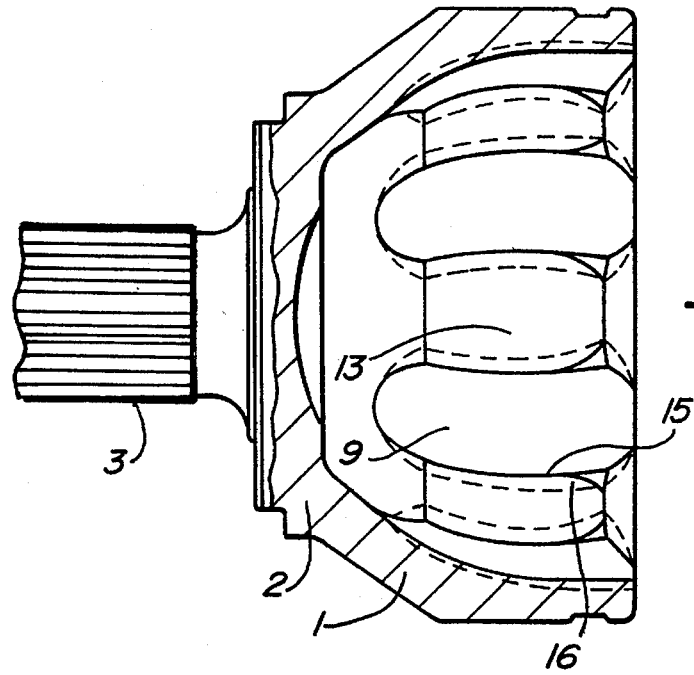
FIG. 2 is a longitudinal section through an outer joint part of a joint according to FIG. 1.

FIG. 2 shows the outer joint part 1 with the ball tracks and the inner faces 13 positioned therebetween. Dashed lines show the hardened regions which extend along the edges 15 of the ball tracks. Due to the hardening of the edges 15, they include an increased volume. Because the dashed line extends on the end face, it becomes clear that hardening does not only affect the longitudinal edges 15 of the tracks 9, but also the track surface in the region of the faces of the tracks 9.

Figure 3:
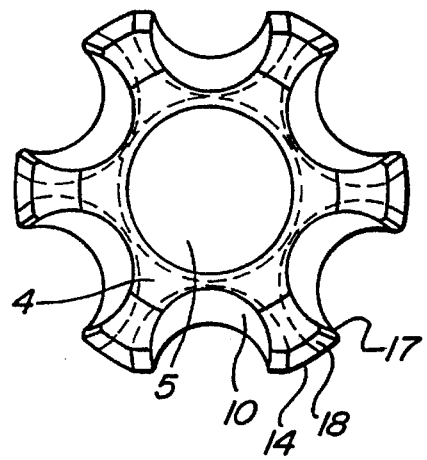
FIG. 3 is a plan view of a joint part of a joint according to FIG. 1.

FIG. 3 illustrates the inner joint part 4 with the ball tracks 10 and the outer faces 14 positioned therebetween. Dashed lines indicate hardened regions which include an increased volume and which form guiding faces 18. The guiding faces 18 extend in the axial direction along the edges 17 of the tracks 10. The outer faces 14 are optionally flattened between the guiding faces 18 so that substantially no carrying function whatsoever exists. Since the dashed line extends on the end face, it becomes clear that hardening does not only affect the longitudinal edges 17 of the tracks 10, but also the track surface in the region of the faces of the tracks 10.

Figure 4:
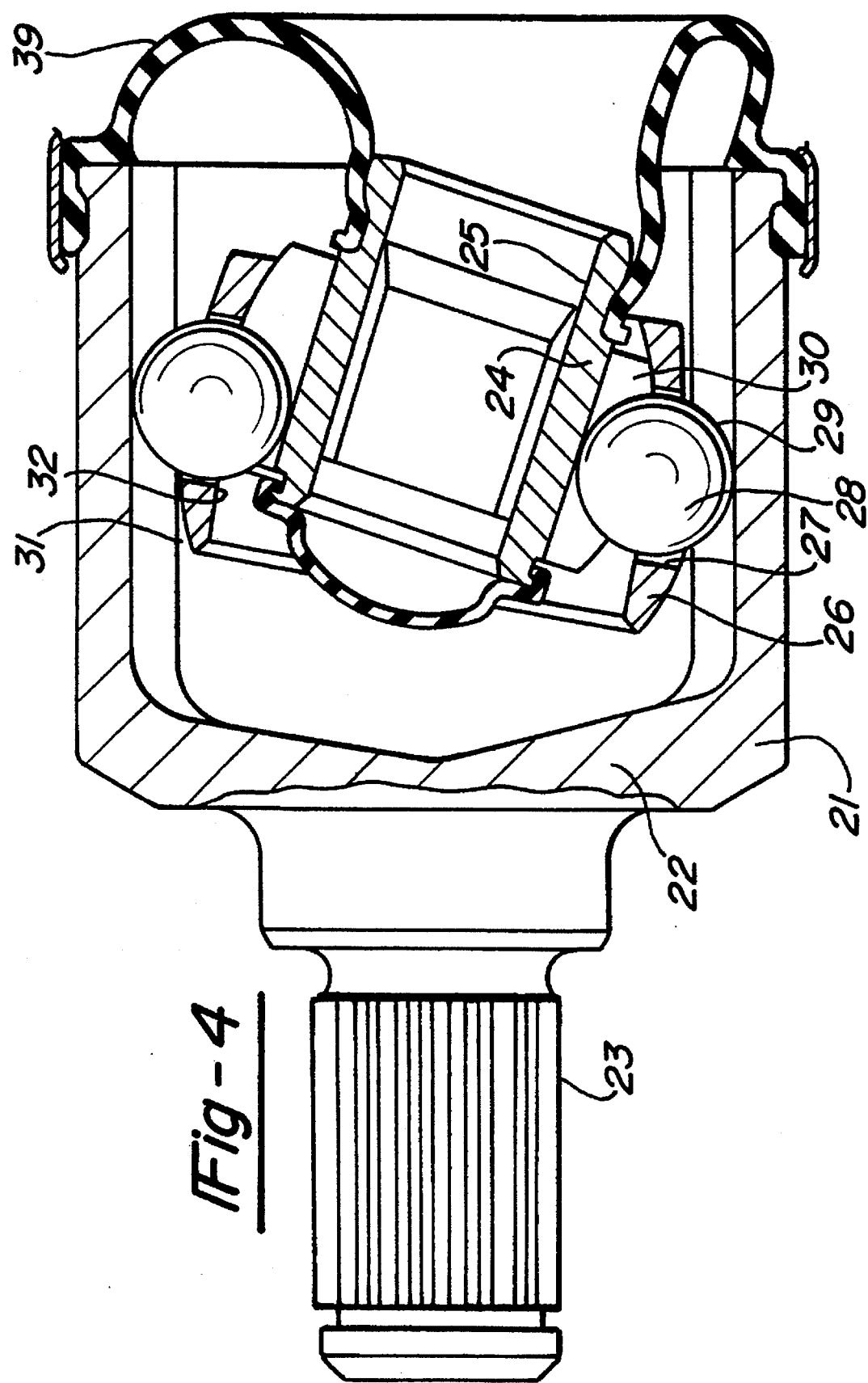
FIG. 4 is a longitudinal partial section view through a constant velocity universal ball plunging joint.

FIG. 4 illustrates a joint of a deviating design in the form of a plunging joint. The elements which, in principle correspond to those of FIG. 1, have reference numbers increased by 20.

FIG. 4 shows an outer joint part 21 having a joint base 22 and a journal 23. An inner joint part 24 with an inner aperture 25 shown in an articulated condition, is positioned into the outer joint part 21.

A cage 26 is positioned between the inner joint part and the outer joint part. The cage 26 includes circumferentially distributed cage windows 27 which accommodate the torque transmitting balls 28. The balls 28 engage ball tracks 29 in the outer joint part and ball tracks 30 in the inner joint part. The tracks 29 and 30, in this case, with reference to the track center line, extend at a constant distance from the center axis of the joint. However, to guide the balls onto the angle-bisecting plane and, to guide the balls on to half the plunging path if the inner joint part is axially displaced relative to the outer joint part, the tracks extend at an angle of inclination relative to the respective axis of the joint component, which angle is not identifiable in the drawing. The cage 26 includes an essentially spherical outer face 31, whereas the inner face 32 extends internally cylindrically and, towards the outside of the joint, forms an axial stop for the inner joint part 24. In the embodiment illustrated, the joint, towards the outside, is sealed with a U shaped boot 39. As in the case of the previous embodiment, the hardened regions, not shown in greater detail, cover at least the track faces and the guiding faces.

Figure 5A:
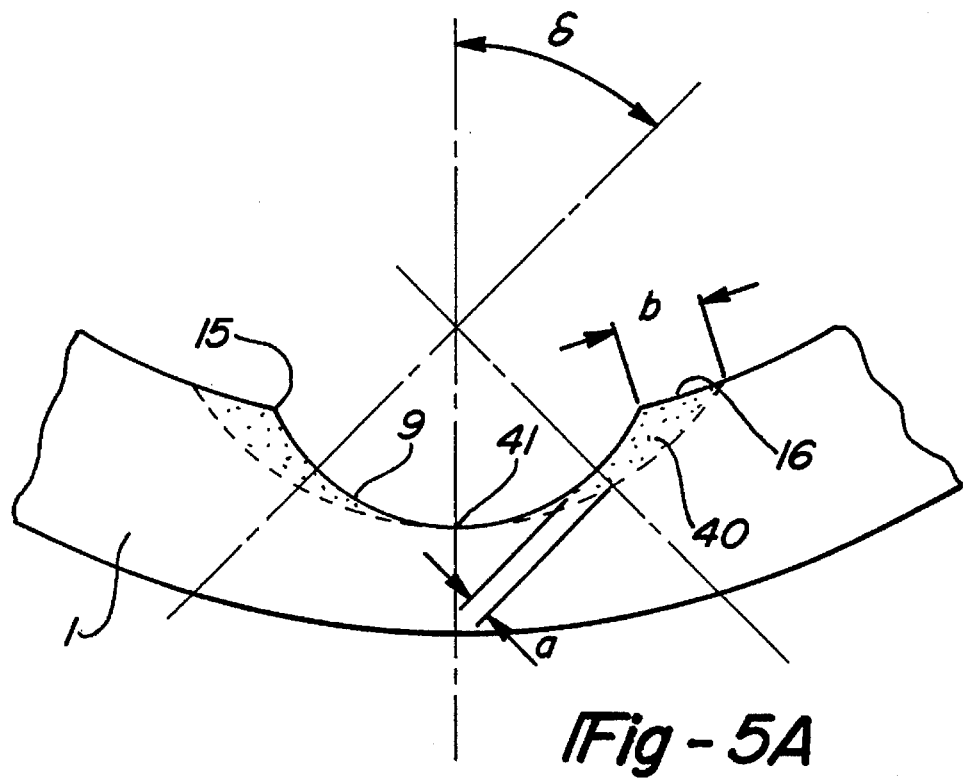
FIG. 5a is a cross-section view through a ball track in an outer joint part shown in a first embodiment.
Figure 5B:
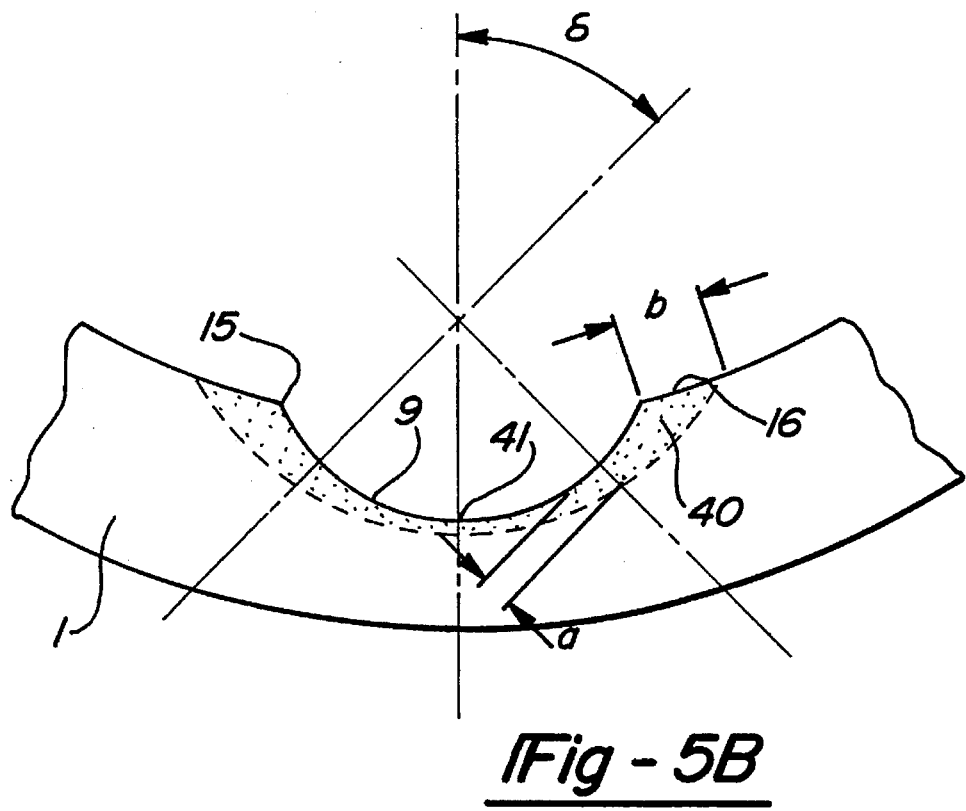
FIG. 5b is a cross-section view through a ball track in an outer joint part shown in a second embodiment.
Figure 5C:
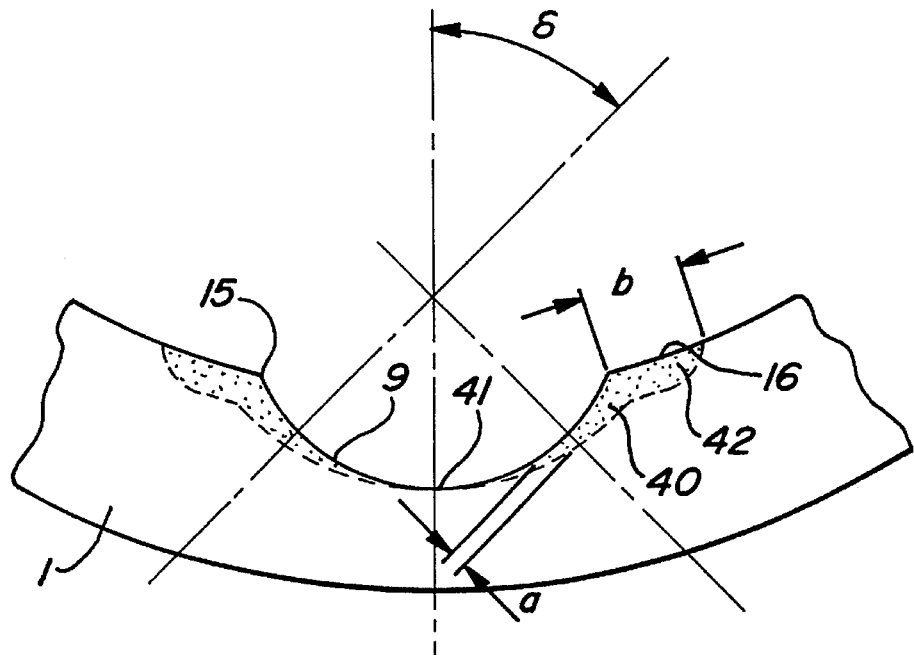
FIG. 5c is a cross-section view through a ball track in an outer joint part shown in a third embodiment.
Figure 5D:
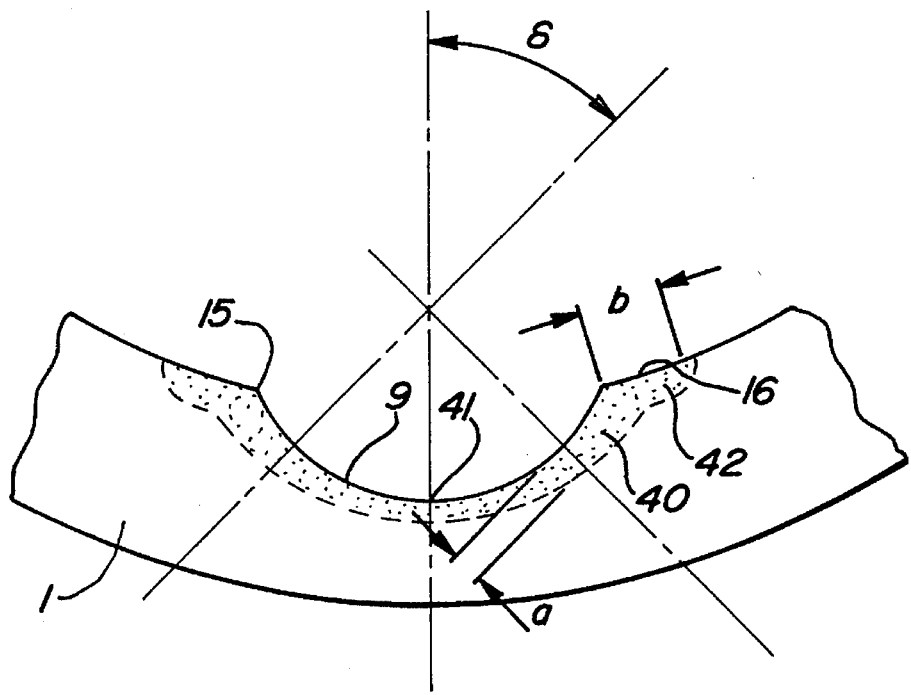
FIG. 5d is a cross-section view through a ball track in an outer joint part shown in a fourth embodiment.

FIGS. 5a to 5d each show a cross-section through an outer joint part 1 in the region of a ball track 9. A dotted cross-section region limited by a dash-dotted line illustrates a hardened zone 40. Optionally, an extended hardened zone 42 may be included. The depth of the hardened zone 40 in the material is smaller in the track base and greater at the track faces near the ball track edges 15. Aspects for functioning are the width (b) of the hardened guiding faces 16 and, in the region of the track 9, the depth (a) of the hardened zone 40 extending at the carrying angle at which load is applied to the track 9 by the ball under torque transmitting conditions. No hardening is envisaged in the track base 41 in FIGS. 5a and 5c. Thus, the depth of useful hardness is reduced to 0 in FIGS. 5a and 5c, whereas in FIGS. 5b and 5d even in the region of the track base 41, a depth clearly deviating from 0 is visible. In FIGS. 5a and 5b the cross-section of the hardened zone 40 is limited in an arch-like way. In FIGS. 5c and 5d the region adjoining the edges 15 is provided with an additional hardened zone 42 of approximately constant depth for widening the guiding face 16.

While the above detailed description describes the preferred embodiment of the present invention, the invention is susceptible to modification, variation, and alteration without deviating from the scope and fair meaning of the subjoined claims.

What is claimed is:

1. A constant velocity joint comprising:

an outer joint part and an inner joint part, each part including a plurality of ball tracks extending substantially in a longitudinal direction and a plurality of faces, each respective face being disposed between adjacent ball tracks;

balls for torque transmission are guided in the opposed tracks in the outer joint part and in the inner joint part;

a cage with cage windows holding each ball in a plane positioned substantially perpendicular relative to a longitudinal axis;

means for guiding the cage with the balls onto an angle-bisecting plane if the axes of the outer joint part and the inner joint part deviate from one another; and at the outer joint part and/or at the inner joint part, each track face of the ball tracks subjected to loads by contact of the balls, as well as a portion of each face adjoining ball tracks, are subjected to a hardening operation and each face including unhardened zones positioned between the face portions.

2. The joint according to claim 1, wherein said portion of each face adjoining the ball tracks undergoing the hardening operation, due to the formation of martensite in turn increase in volume.

3. The joint according to claim 1, wherein the hardened portion of the faces are each circumferentially widened towards the axial ends of the ball tracks.

4. The joint according to claim 1, wherein the hardened face portions of the outer joint part and/or the inner joint part are hardened to a greater depth, from the respective surface into the material, than in the region of the track faces of the ball tracks.

5. The joint according to claim 4, wherein the outer joint part and/or the inner joint part, on the hardened face include greater depths of hardness, from the respective surface into the material, and in the region of the track faces decreasing depths of hardness.

6. The joint according to claim 1, wherein the outer joint part and/or the inner joint part are hardened in the face portion adjacent the track and of the track faces near the track edges and the track surfaces in the track base are unhardened.

7. The joint according to claim 6, wherein the outer joint part and/or the inner joint part, on the hardened faces include greater depths of hardness, from the respective surface into the material, and in the region of the track faces decreasing depths of hardness.

8. A constant velocity joint comprising:

an outer joint part and an inner joint part, each part including a plurality of ball tracks extending substantially in a longitudinal direction and of plurality a faces, each respective face being disposed between adjacent ball track;

balls for torque transmission are guided in the opposed tracks in the outer joint part and in the inner joint part;

a cage with cage windows holding each ball in a plane positioned substantially perpendicular relative to a longitudinal axis;

means for guiding the cage with the balls onto an angle-bisection plane if the axes of the outer joint part and the inner joint part deviated from one another; and at the outer joint part and/or at the inner joint part, each track face of the ball tracks subjected to loads by contact of the balls, as well as a portion of each face adjoining the ball tracks; are subjected to a operation and each face including unhardened zones positioned between the face portions, wherein said portions undergoing the hardening operation, due to the formation of martensite in turn increase in volume.

9. A constant velocity joint comprising:

an outer joint part and an inner joint part, each part including a plurality of ball tracks extending substantially in a longitudinal direction and a plurality of faces, each respective face being disposed between adjacent ball tracks;

balls for torque transmission are guided in the opposed tracks in the outer joint part and in the inner joint part;

a cage with cage windows holding each ball in a plane positioned substantially perpendicular relative to a longitudinal axis;

means for guiding the cage with the balls onto an angle-bisecting plane if the axes of the outer joint part and the inner joint part deviate from one another; and at the outer joint part and/or at the inner joint part, each track face of the ball tracks subject to loads by contact of the balls, as well as a portion of each face adjoining the ball tracks, are subjected to a hardening operation and each face including unhardened zones positioned between the face the portions, wherein in the region of the guiding faces, the outer joint part and/or the inner joint part are hardened to a greater depth from the respective face into the material than in the region of the track faces of the ball tracks.

10. A constant velocity joint comprising:

an outer joint part and an inner joint part, each part including a plurality of ball tracks extending substantially in a longitudinal direction and a plurality of faces, each respective face being disposed adjacent ball tracks;

balls for torque transmission are guided in the opposed tracks in the outer joint part and in the inner joint part;

a cage with cage windows holding each ball in a plane positioned substantially perpendicular relative to a longitudinal axis;

means for guiding the cage with the balls onto an angle-bisecting plane if the axes of the outer joint part and the inner joint part deviate from one another; and at the outer joint part and/or at the inner joint part, each track face of the ball tracks subjected to loads by contact of the balls, as well as a portion of each face adjoining the ball tracks, are subjected to a hardening operation and each face including unhardened zones positioned between the face portions, wherein the outer joint part and/or the inner joint part track faces are hardened near the track edges and the track surfaces in the track base are unhardened.

* * * * *

UNITED STATES PATENT AND TRADEMARK OFFICE
CERTIFICATE OF CORRECTION

PATENT NO. : 5,501,639
DATED : March 26, 1996
INVENTOR(S) : Werner Krude

It is certified that error appears in the above-indentified patent and that said Letters Patent is hereby corrected as shown below:

Column 1, line 41, "forman" should be --form an--

Column 3, line 48, after "ball tracks" insert --9--

Column 5, line 7, Claim 1, after "adjoining" insert --the--

Column 5, line 23, Claim 5, "face" should be --faces--

Column 5, line 40, Claim 8, "of plurality a" should be --a plurality of--

Column 5, line 42, Claim 8, track should be --tracks--.

Column 5, line 50, Claim 8, "bisection" should be --bisecting--

Column 5, line 51, Claim 8, "deviated" should be --deviate--

Column 5, line 55, Claim 8, before "operation" insert --hardening--

Column 6, line 21, Claim 9, "subject" should be --subjected--

Column 6, line 25, Claim 9, after "face" delete --the--

Column 6, line 34, Claim 10, after "disposed" insert --between--

Signed and Sealed this

Eighth Day of October, 1996

Attest:

BRUCE LEHMAN

Attesting Officer

Commissioner of Patents and Trademarks